United States Patent [19]
Vogel et al.

[11] Patent Number: 6,117,406
[45] Date of Patent: Sep. 12, 2000

[54] PROCESS FOR MANUFACTURING AMMONIUM SALTS

[75] Inventors: Edmond Vogel, Vaucresson; Jacqués Monsterleet, Marly le Roi, both of France

[73] Assignee: Kaltenbach-Thuring S.A., Beauvais, France

[21] Appl. No.: 09/249,549

[22] Filed: Feb. 12, 1999

Related U.S. Application Data

[62] Division of application No. 08/970,208, Nov. 14, 1997, Pat. No. 5,904,906.

[30] Foreign Application Priority Data

Nov. 18, 1996 [FR] France ................................. 96 14028

[51] Int. Cl.[7] ............................. C01B 25/28; C01C 1/18; C01C 1/16; C01C 1/242
[52] U.S. Cl. .................... 423/310; 423/313; 423/396; 423/470; 423/549; 423/659
[58] Field of Search ...................... 423/310, 313, 423/396, 470, 549, 659

[56] References Cited

U.S. PATENT DOCUMENTS

| | | | |
|---|---|---|---|
| 1,923,212 | 8/1933 | Jost et al. | 423/396 |
| 2,524,341 | 10/1950 | Chapman et al. | 423/549 |
| 2,902,342 | 9/1959 | Kerley, Jr. | 423/310 |
| 3,301,657 | 1/1967 | Dee et al. | 423/396 |
| 3,579,297 | 5/1971 | Ekblom | 423/396 |
| 3,730,700 | 5/1973 | Groenveld | 423/310 |
| 4,313,918 | 2/1982 | Hendriks et al. | 423/310 |
| 4,699,773 | 10/1987 | Ulrichs et al. | 423/396 |

*Primary Examiner*—Wayne Langel
*Attorney, Agent, or Firm*—Dowell & Dowell, P.C.

[57] ABSTRACT

A process for manufacturing ammonium salts using a reactor which includes a first tubular reaction chamber having at least one acid feed and at least on ammonia feed which are arranged in a first up-stream part of the reactor. At least one second ammonia feed is introduced into a second part of the reactor which is arranged as an extension of the first and which includes, in a flow direction, a convergent segment, a cylindrical tube and a divergent segment. The second ammonia feed communicates with the second part in the vicinity of the convergent segment and the processes is controlled to obtain basic vapors at an outlet of the reactor.

6 Claims, 5 Drawing Sheets

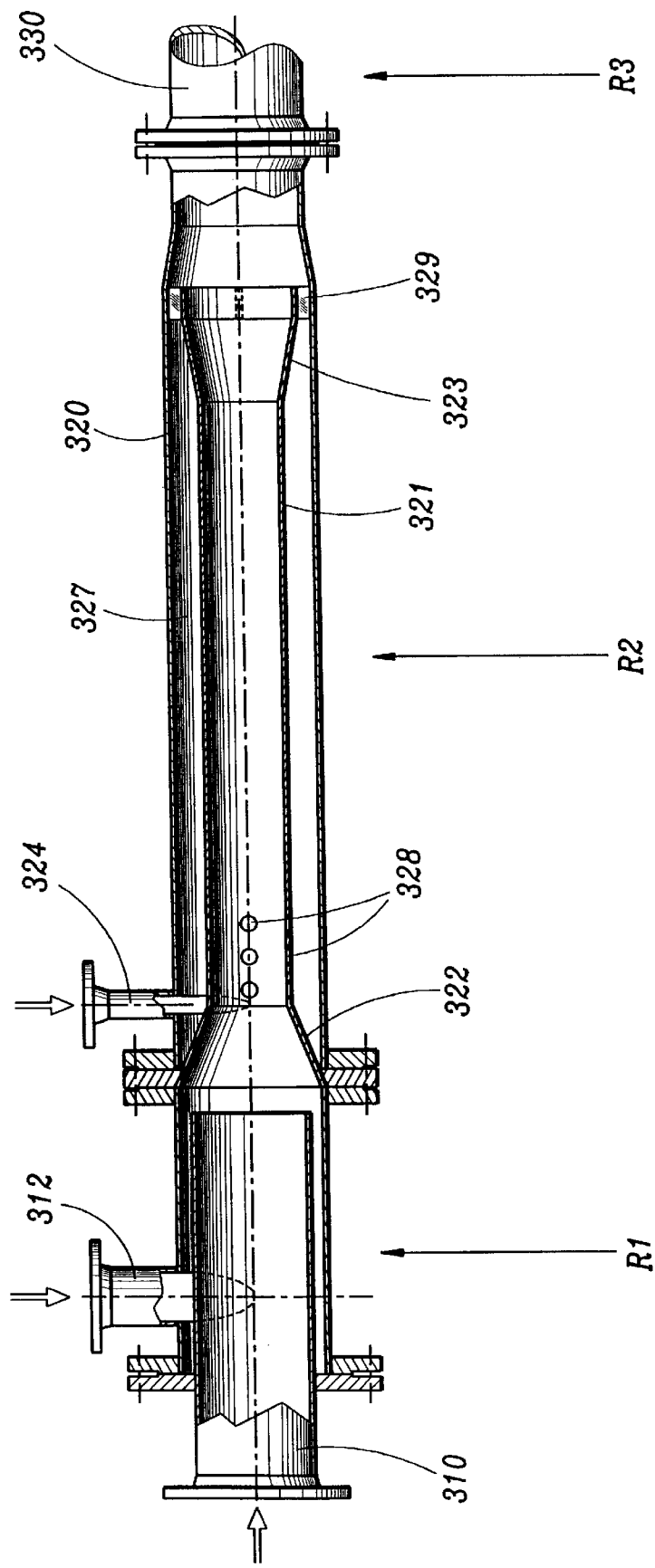

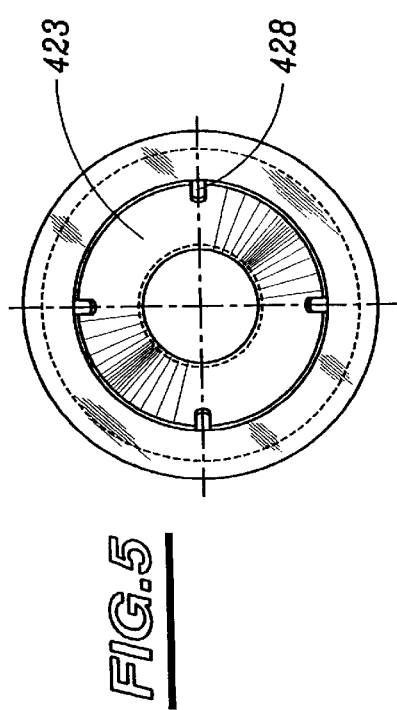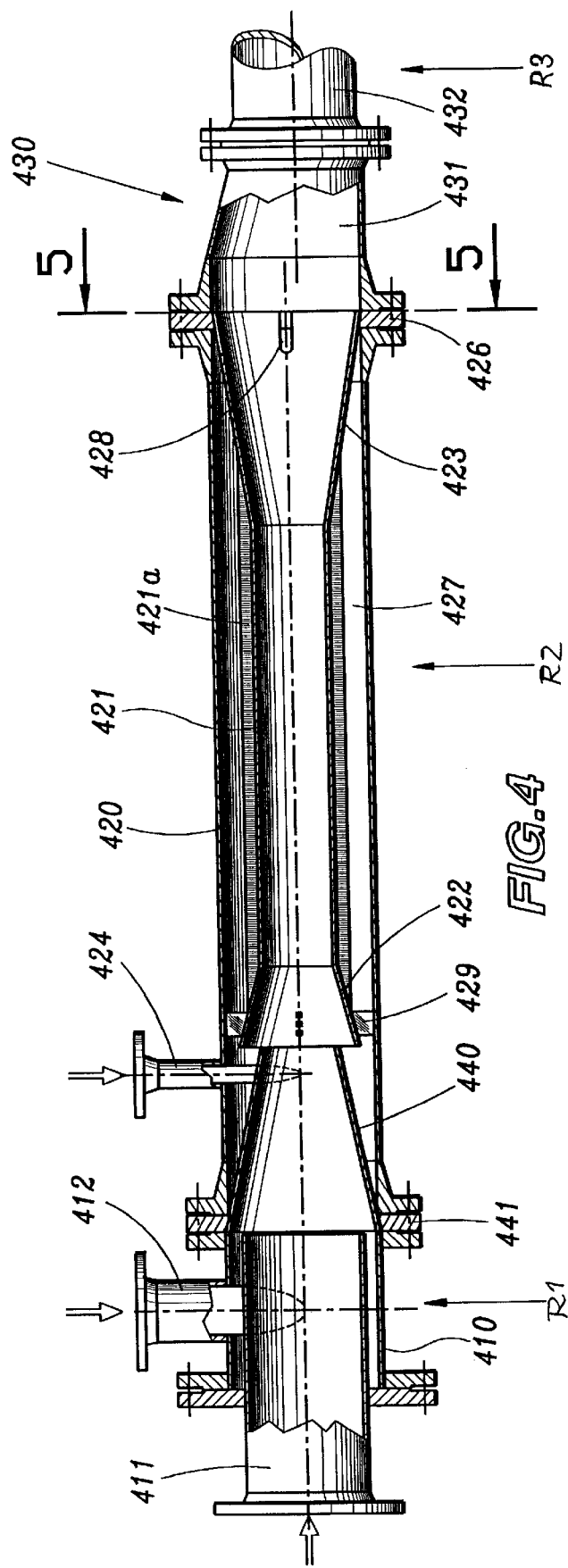

PROCESS FOR MANUFACTURING AMMONIUM SALTS

This is a divisional of application Ser. No. 08/970,208 filed on Nov. 14, 1997, U.S. Pat. No. 5,904,906.

BACKGROUND OF THE INVENTION

Field of the Invention

The present invention relates to the manufacture of ammonium salts used, in particular, as fertilizers.

In particular, processes for manufacturing ammonium salts using a tubular reactor are disclosed by numerous documents (patents U.S. Pat. No. 2,568,901, U.S. Pat. No. 2,755,176, U.S. Pat. No. 2,902,342). According to these processes, the two reactants (acid and base) are introduced into a tubular reaction chamber in substantially stoichiometric proportions, that is to say mole for mole. The reaction chamber proper is extended by a tube of diameter substantially similar to that of the chamber, in which the neutralization reaction continues. Of the supply conduits of the two reactants, one may deliver axially into the reaction chamber and the other tangentially. Their mixing is promoted by the presence of elements which can generate turbulence, for example venturis, baffles, etc.

The total length of the reaction chamber and of the tube which extends it is in general large (often more than 50 times the diameter of the tube), so as to allow a neutralization reaction which is as complete as possible.

It has been found that, in this type of reactor and process, the high temperature resulting from the exothermic reaction between the base and the acid (in the case of ammonia and nitric acid, this temperature may be between 150 and 220° C.) makes the unneutralized nitric acid droplets extremely corrosive. This results in rapid destruction of the entire reactor, making it necessary to replace it after a period which may be of the order of 6 to 12 months. Longer service could be achieved by using, for example, titanium instead of stainless steel, but this would make the cost of the reactor prohibitive.

It is also found in these known processes that, in spite of the stoichiometric proportions used and the overall length of the reactor, the reaction is not complete and ammonia remains in the vapour which is separated from the nitrate solution at the outlet of the reactor.

The invention forming the subject of this patent proposes mainly to solve the first of the two problems mentioned above, namely to reduce or, if possible, eliminate the corrosion of the reactor.

It also proposes to reduce the ammonia losses and consequently improve the yield of the neutralization.

SUMMARY OF THE INVENTION

To this end, its main subject is a reactor for manufacturing ammonium salts, comprising a tubular reaction chamber, at least one acid feed and at least one ammonia feed, which are arranged in a first part or upstream part of the reactor, wherein said reactor comprises a second part arranged in extension of the first and including, in the flow direction: a convergent segment, a cylindrical segment and a divergent segment, this second part being provided with at least one second ammonia feed which delivers into this second part in the vicinity of the convergent segment.

According to other characteristics:
  the second part of the reactor comprises a single tube;
  this part comprises an outer tube and an inner tube, delimiting between themselves an annular chamber communicating, at least at its downstream end, with the internal volume of the inner tube;
  in its upstream part, the inner tube includes at least one passage communicating with the annular chamber.

A further subject of the invention is a process for manufacturing ammonium salt, in which reactants comprising at least one acid and ammonia are introduced in the vicinity of the upstream end of a tubular reactor for achieving a neutralization reaction and forming a salt in solution and vapour, and the salt in solution is then separated from the vapour leaving the reactor in an expansion chamber, wherein between 80 and 99% of the total reactant flow is introduced in the upstream part of the reactor, the remaining part of the ammonia is introduced in a second part of the reactor, lying in extension of the first, so that the vapour separated in the expansion chamber has a basic pH, and the neutralization reaction is terminated in an additional step, by bringing the basic vapours leaving the expansion chamber into contact with the remaining part of the acid.

According to other characteristics of this process:
  the acid and the ammonia which are introduced in the upstream part of the tubular reactor are kept in substantially stoichiometric proportions;
  the ammonia flow introduced in the second part of the reactor is controlled so as to obtain the desired excess of ammonia in the downstream part of the reactor, and so as, after separation in the expansion chamber, to obtain vapours having a basic pH, preferably greater than 9;
  the additional step during which the neutralization reaction is terminated is carried out by neutralizing the basic vapours using a washing solution formed by a mixture of recycled ammonium salt and acid.

Lastly, another subject of the invention is a plant for manufacturing ammonium salt, for implementing the process defined above and comprising, in particular, a reactor according to the invention.

More precisely, this plant comprises a tubular reactor, at least one ammonia feed and at least one acid feed delivering into a first part, or upstream part, of the reactor, this reactor delivering to an expansion chamber in which the salt in solution is separated from the vapour, and it is characterized in that the reactor is as designed according to the invention and an additional stage is provided in which the vapour from the expansion chamber is brought into contact with the remaining part of the acid, so as to obtain complete neutralization.

BRIEF DESCRIPTION OF THE DRAWINGS

The invention will be described in more detail below with reference to the appended drawings, which are given solely by way of examples and in which:

FIGS. 1 to 4 are longitudinal sectional views of four variants of a tubular reactor according to the invention;

FIG. 5 is a view in section on the line 5—5 in FIG. 4; and

DESCRIPTION OF THE PREFERRED EMBODIMENTS

Figure 1:
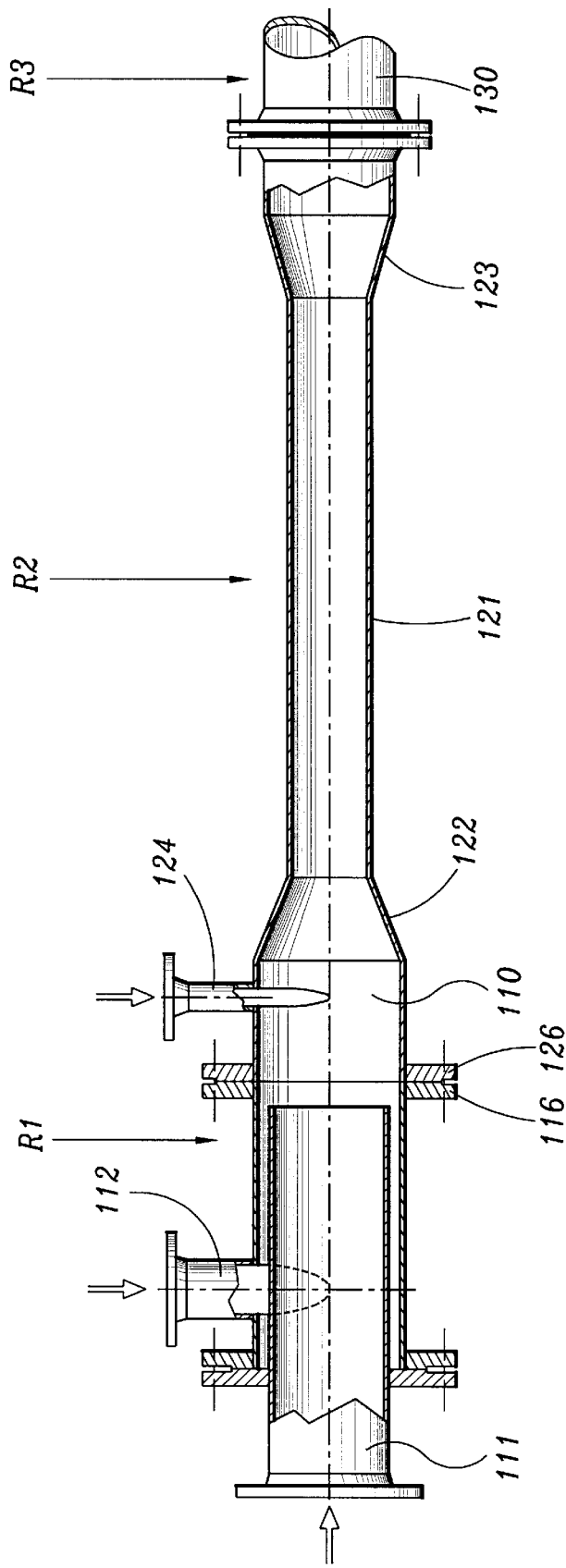

FIG. 1 represents a tubular reactor R comprising three parts or segments $R_1$, $R_2$, $R_3$. The first part, or upstream part, $R_1$ constitutes a reaction chamber 110 into which, on the one hand, an axial ammonia gas feed conduit 111 and, on the other hand, a radial or preferably tangential acid feed conduit 112 deliver, though the positions of these two feeds may be reversed or modified.

The second part comprises a tube 121, of diameter less than that of the tube delimiting the chamber 110, extended at its upstream part by a convergent 122 and at its downstream part by a divergent 123. An ammonia gas feed conduit 124 delivers, preferably tangentially, into a short cylindrical tube segment arranged immediately upstream of the convergent 122 and of diameter substantially equal to that of the tube delimiting the chamber 110. For ease of manufacture, the ammonia inlet conduit 124 may be arranged upstream of the flanged connection between the segments $R_1$ and $R_2$ of the reactor. In this case, the axial positions, in FIG. 1, of the flanges 116, 126, on the one hand, and of the conduit 124, on the other hand, are substantially reversed.

The reactor is supplemented by a third tube 130 which is fixed to the downstream end of the segment $R_2$ and the diameter of which is close to or optionally slightly less than that of the tube 110, while its length may be between 10 and 50 times its diameter. However, preferably and by virtue of the improvement provided by the invention, the length of this third part or segment $R_3$ may be kept as short as possible and less than it must be in known arrangements.

Figure 2:
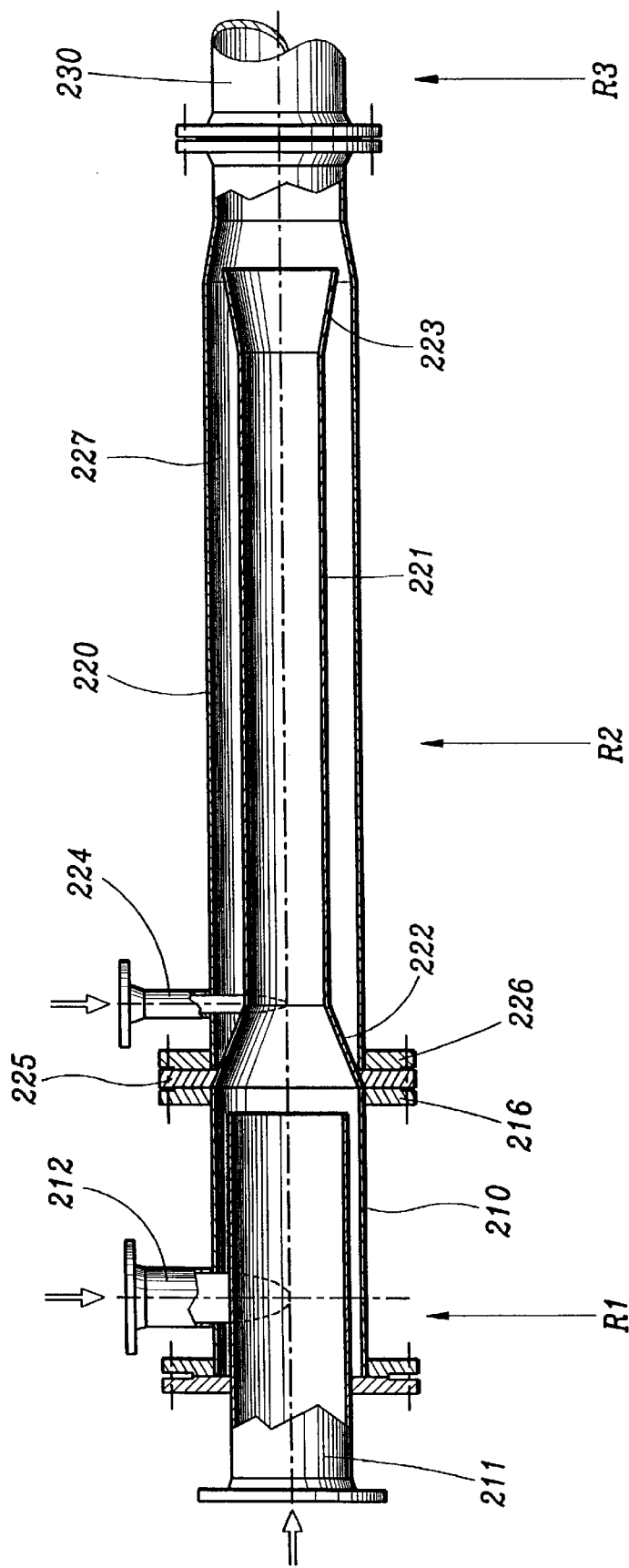

In the embodiment shown in FIG. 2, the elements similar to those in FIG. 1 are denoted by the same numerical references. The first part includes an axially gas feed 211 and a radial acid feed 212 with 100 added. The second part comprises an outer tube 220, of diameter substantially equal to that of the segment 210, and an inner tube 221, of smaller diameter, including a convergent 222 at its upstream part and a divergent 223 at its downstream part. The inner tube is here cantilevered by being fixed at its upstream end by a flange 225 clamped between two flanges 216, 226 secured to the segment 210 and the outer tube 220, respectively. A third tube 230 is connected to tube 2200.

A chamber 227, of substantially annular shape, is delimited between the outer tube and the inner tube, and an ammonia gas feed conduit 224 delivers in the vicinity of the upstream part of this chamber.

The reactor represented in FIG. 3 is very similar in its design to the one represented in FIG. 2. The reactor includes a first chamber with axial gas feed 310, radial acid feed 312, a second part with a convergent segment 322, outer tube 320 and divergent segment 323 and third part 330. However, in its upstream region, the cylindrical inner tube 321 includes a plurality of series of orifices 328 connecting the interior of this tube to the annular chamber 327. These orifices are located in the vicinity of the ammonia supply constituted by the tangential conduit 324.

Furthermore, at its downstream end the inner tube is guided in the outer tube by means of at least three spacers 329.

In the variant represented in FIG. 4, a reactor R in three parts $R_1$, $R_2$, $R_3$ is seen. As in the previous examples, the upstream part comprises a tube 410 into which the respective axial 411 and tangential 412 reactant feed conduits deliver.

The second part $R_2$ of the reactor comprises an outer tube 420 of diameter substantially equal to that of the tube 410.

This outer tube contains, on the one hand, a convergent 440 consisting of a tube segment, of frusto-conical shape, fixed by a flange 441 between the tubes 410 and 420 and, on the other hand, an inner tube fixed in the vicinity of its downstream end by a flange 426, between the tube 420 and the tube 430 constituting the third part $R_3$ of the reactor.

This inner tube comprises a cylindrical tube segment 421, a convergent 422 located at its upstream end, with an entry diameter greater than the exit diameter of the convergent 440, and a divergent 423 arranged at its downstream end. The inner tube preferably includes stiffening ribs 421a extending over its entire length, and spacers 429 for guiding it relative to the outer tube 420.

An annular chamber 427 is delimited between the outer tube 420, on the one hand, and the convergent 440 and the inner tube 421, on the other hand, and an ammonia gas feed conduit 424 delivers in the vicinity of the upstream part of this chamber.

The downstream end of the inner tube includes a plurality of openings 428 connecting its internal volume to the annular chamber 427 (FIGS. 4 and 5).

In the example represented, the third part or segment $R_3$ of the reactor comprises an intermediate connecting segment 431 and a tube 432, slightly smaller in diameter than the tube 420 and with a length which may be between 10 and 50 times its diameter, but it is preferable to keep this in the lower part of this range or even below.

Figure 6:
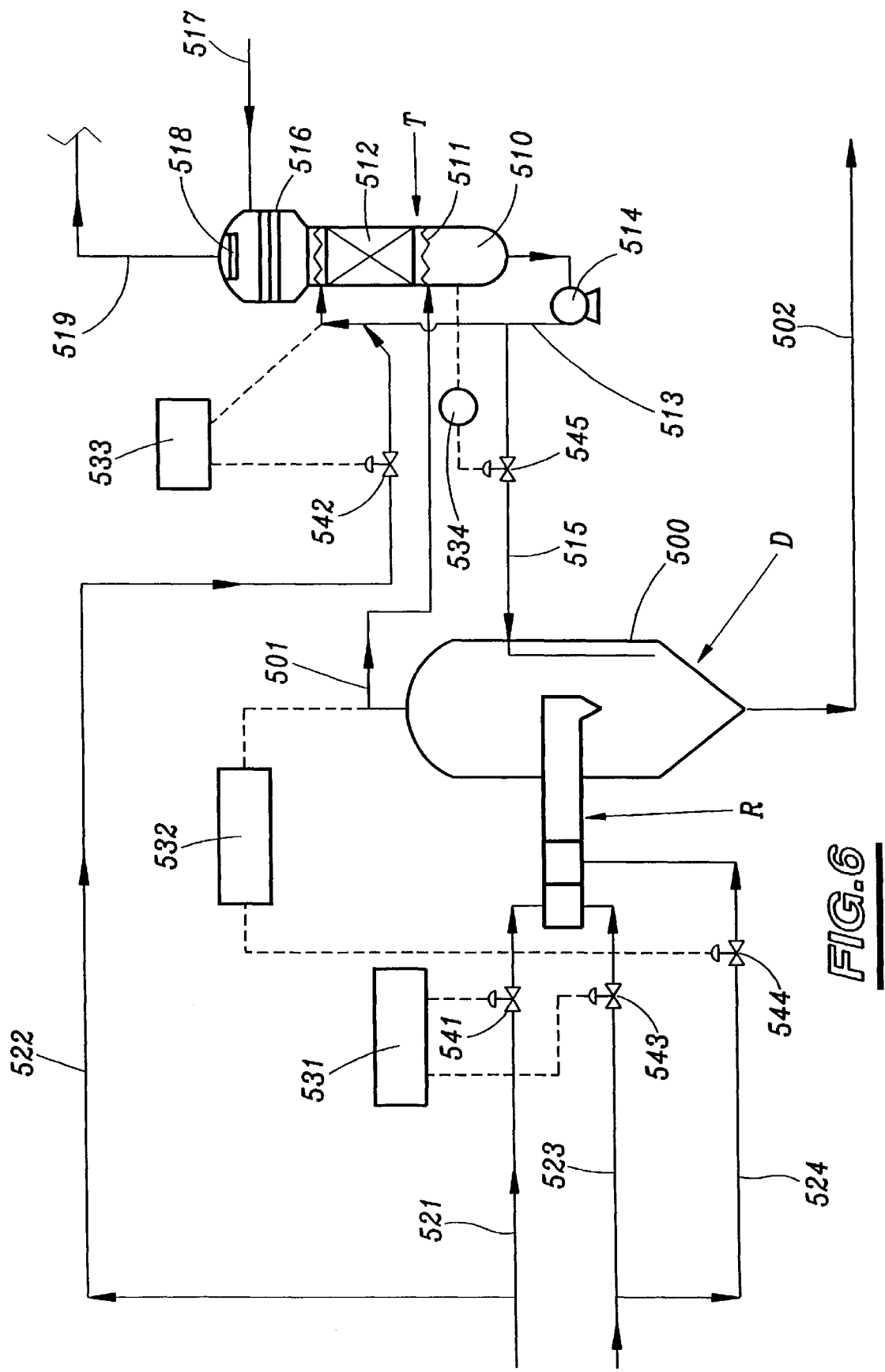
FIG. 6 is a diagram of an ammonium salt manufacturing plant implementing the invention.

With reference to FIG. 6, a description will now be given of a plant for manufacturing ammonium salt, for example ammonium nitrate, with which a reactor R according to the invention, for example in the form of one or other of the variants described above, is incorporated.

In addition to this reactor R, this plant comprises an expansion chamber D and a treatment column T.

The expansion chamber consists of a tank 500 into which the end of the reactor R delivers, preferably tangentially, so as efficiently to separate the nitrate solution flowing downwards from the vapour which follows an upward movement and escapes via a conduit 501. In its upper part, it may advantageously include a droplet separator device, of woven mat, bubble plate or packing type, or any other equivalent means, which retains any droplets which may be entrained by the vapour. In its lower part, it has a conical shape and is connected to a conduit 502 for removing the nitrate solution.

The treatment or washing column T includes, for example, from the bottom upwards, the following sections:
  a liquid tank 510;
  a device 511 for injecting the vapour leaving the expansion tank via the conduit 501;
  a first region 512 which includes packing elements of the ring, plate or other type;
  a circuit 513 for recirculating liquid leaving the lower part of the column, including a pump 514; a level control in the tank 510 makes it possible to remove excess salt solution and send it to the tank 500 via a line 515;
  a second region 516, including packing elements or a series of bubble-cap plates or equivalents;
  an inlet 517 for clean water and/or for process condensates treated beforehand;
  a droplet separator 518 of the woven mat, bubble plate or packing element type, etc.;
  a vapour discharge line 519.

As a variant, the column T may be replaced by a series of independent elements, placed above one another and fulfilling substantially the same functions as the various stages of the column T. Similarly, the neutralization region 512 containing the packing elements may be replaced by a venturi reactor or similar equivalent means.

The reactant feed circuits comprise:
  a circuit for nitric acid at the appropriate concentration, comprising two lines 521, 522, a line 521 for feeding the reactor R and a line 522 which delivers into the nitrate solution recirculation circuit 513 associated with the treatment column; this line 522 could, as a variant, deliver directly into the treatment column T;

an ammonia feed circuit, also comprising two lines 523, 524, respectively feeding the upstream $R_1$ and intermediate $R_2$ segments of the reactor. As a variant, the main ammonia feed 523 may be distributed between two conduits, one delivering upstream and one delivering downstream of the point where the line 524 providing the controlled additional amount of ammonia enters the reactor.

As is known, the nitric acid and the ammonia may be preheated in suitable heat exchangers (not shown), preferably supplied with the vapour produced in the plant, so as to improve the thermal efficiency of the reaction.

The plant is supplemented by a control device, schematized at 531, 532, 533, 534, which controls the flow rates in the various lines of the plant as a function of set-point values and measured values of a number of parameters.

This control device acts on valves placed respectively on the various lines, only the main ones 541, 542, 543, 544 and 545 of which have been represented in the drawings.

In general, this device will not be described in detail, and merely the main functions fulfilled will be indicated, the means of effecting such control being well-known to the person skilled -in the art.

A reactor and a plant according to the invention operate as follows:

Most of the neutralization reaction takes place in the reactor R. The acid and ammonia flow rates in part $R_1$ are controlled so as to keep a ratio which is as close as possible to the stoichiometric ratio, for example to within ±1%, and preferably with a very slight excess of ammonia. Between 80 and 99%, and preferably between 92 and 99%, for example 98%, of the total reactant flow is introduced in the upstream reaction chamber $R_1$ of the reactor. The nitric acid has a concentration of between 50 and 70%, and preferably between 55 and 63%. In the case of sulphuric acid and phosphoric acid, the concentration selected may be between 70 and 99%, and between 52 and 70%, respectively. The ammonia is in anhydrous gas form.

The remaining percentage of ammonia is introduced in the second segment $R_2$.

In the example in FIG. 1, the fact that an additional amount of ammonia is introduced in the central part $R_2$ of the reactor has the effect of improving the yield of the reaction and of limiting the corrosion in this central part. Furthermore, the tube 121, 122, 123 which constitutes the reactor part liable to suffer the largest degree of corrosion may be considered as a consumable part, the cost of which is substantially less than that of the entire reactor.

In the embodiment in FIG. 2, the presence of an inner tube in the central part $R_2$ of the reactor, and the fact that an additional amount of ammonia is introduced in the annular chamber 227, limits the corrosion substantially to just the inner element 221, 222, 223 of this central part.

In the embodiment in FIGS. 3 and 4, the presence of orifices 328, in the first case, and the provision of convergents 422 and 440, in the second case, causes the ammonia leaving via the conduit 324, 424, to be sucked in the direction of the inner tube. Depending on the operating conditions of the reactor, a flow may be set up in the annular chamber 327, 427, either in the downstream direction or in the opposite direction. In the two examples, this circulation guarantees that nitrate cannot stagnate in this intermediate region, which could represent a danger in view of the explosive nature of this product.

In general, as a variant, the tubes 121; 221; 321; 421, 440, of small length (1 m to 1.8 m, for example) may be made of titanium.

According to the invention, the ammonia flow rate in the line 524 is controlled so as to obtain the desired excess of ammonia in the parts $R_2$ and $R_3$, and to obtain, in the expansion tank 500, vapours which have a basic pH, for example greater than 9. The device 532 therefore controls the opening of the valve 544 as a function of the value of the pH measured on the line 501.

In known fashion, the nitrate solution and the vapour separate in the tank 500, the solution being collected in the lower part of the latter, while the vapour is removed in the upper part.

The pressure in this tank is preferably kept between 1 and 8 bar, the reactor being, for its part, preferably fed with ammonia and nitric acid at pressures of between 5 and 10 bar, in order to allow sufficient expansion in the tank.

The basic vapours which enter the treatment column T are neutralized therein by the addition of a washing solution formed by a mixture of ammonium nitrate, recycled from the bottom of this column, and nitric acid, the quantity of nitric acid injected via the line 522 into the circuit 513, or into the column T, being conditioned by the pH of the ammonium nitrate solution recycled to the column. The set-point of the pH meter 533 is fixed so as to obtain a washing solution which is sufficiently acidic to neutralize the remaining ammonia.

This pH meter acts on the control valve 542 of the line 522 via which the nitric acid arrives. The concentration of the acidic washing solution is advantageously between 5 and 20%, but may be increased to 40%.

The presence of this column has the result that complete neutralization and substantially ammonia-free vapours are obtained. The two problems mentioned at the start of this document are therefore indeed resolved by the invention.

We claim:

1. A process for manufacturing ammonium salt, in which reactants comprising at least one acid and ammonia are introduced in the vicinity of an upstream part of a tubular reactor achieving a neutralization reaction and producing salt in solution and vapour leaving the reactor in an expansion chamber, wherein between 80 and 99% of the total are kept in generally stochiometric ratio reactant flow consisting of a first portion of the at least one acid and a first portion of the ammonia which is introduced in the upstream part of the reactor, a remaining portion of the ammonia being introduced into the reactor adjacent an upstream end of a second part of the tubular reactor which second part is an extension of the first, so that the vapours separated in the expansion chamber have a basic pH, and the neutralization reaction being terminated in an additional step, by bringing the basic vapors leaving the expansion chamber into contact with a remaining portion of the at least one acid.

2. A process according to claim 1, wherein the amount of reactants introduced in the upstream part of the reactor represents between 92 and 99% of the total reactant flow.

3. A process according to claim 1, wherein the remaining portion of the ammonia introduced in the second part of the reactor is controlled so as to obtain an excess of ammonia in the downstream part of the reactor, and so as, after separation in the expansion chamber, to obtain vapours having a basic pH, greater than 9.

4. A process according to claim 1, wherein the additional step during which the neutralization reaction is terminated is carried out by neutralizing the basic vapours using a washing solution formed by a mixture of recycled ammonium salt and acid.

5. A process according to claim 1, wherein the amount of the remaining portion of the at least one acid used during the additional step is controlled as a function of the pH of a recycled ammonium salt solution.

6. A process according to claim 1, wherein the first portion of the ammonia introduced in the upstream part of the reactor is introduced via at least two conduits, the sum of the flow rates introduced via these two conduits, the sum of the flow rates introduced via these two conduits being in a generally stoichiometric ratio with the first portion of the at least one acid introduced into the reactor.

* * * * *